Jan. 24, 1956 N. S. MARSHALL 2,731,761
CRAB TRAP

Filed June 8, 1954 2 Sheets-Sheet 1

Norman S. Marshall
INVENTOR.

BY *Clarence A. O'Brien*
*and Harvey B. Jacobson*
Attorneys

Jan. 24, 1956 N. S. MARSHALL 2,731,761
CRAB TRAP

Filed June 8, 1954 2 Sheets-Sheet 2

Norman S. Marshall
INVENTOR.

BY
Attorneys

United States Patent Office 2,731,761
Patented Jan. 24, 1956

2,731,761

CRAB TRAP

Norman S. Marshall, Atlantic, Va.

Application June 8, 1954, Serial No. 435,311

2 Claims. (Cl. 43—100)

The present invention relates to crab traps and more particularly relates to a crab trap of the type disclosed in Patent No. 2,123,471, issued to Benjamine F. Lewis on July 12, 1938, being an improvement thereover.

Crab traps of the type disclosed in the Lewis Patent No. 2,123,471, have been utilized successfully for many years. However, the traps are formed solely of wire mesh with interlacing wire strands at the mating edges of the mesh which do not readily adapt them for swift running tides or deep water operations because of the relative fragility, the traps becoming misshapen quickly and necessitating rapid replacement.

Commercial crabbers use a large volume of such traps yearly and the traps are generally purchased in large quantities, volume trapping being necessary to enable any profit to the crabbers. Consequently, the initial cost of the traps is vitally important, the Lewis type trap being highly satisfactory in this respect, but under certain conditions enumerated somewhat above, the upkeep on the Lewis type traps is relatively prohibitive.

Consequently, the basic object of the present invention is to provide an improved crab trap of the Lewis type falling in the same general cost range, and which will be adaptable for use in deep water and swift tide running water without necessitating a high incidence of replacement and repair and which will be substantially more durable and longer lasting than the Lewis type trap.

In accordance with the primary object, it is an important object of the invention to provide such a trap wherein the trap is provided with a rigid skeleton supporting frame to which the wire mesh of the trap is applied in a novel manner greatly decreasing the cost which would ordinarily be incident to the provision of such supporting frame.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1:
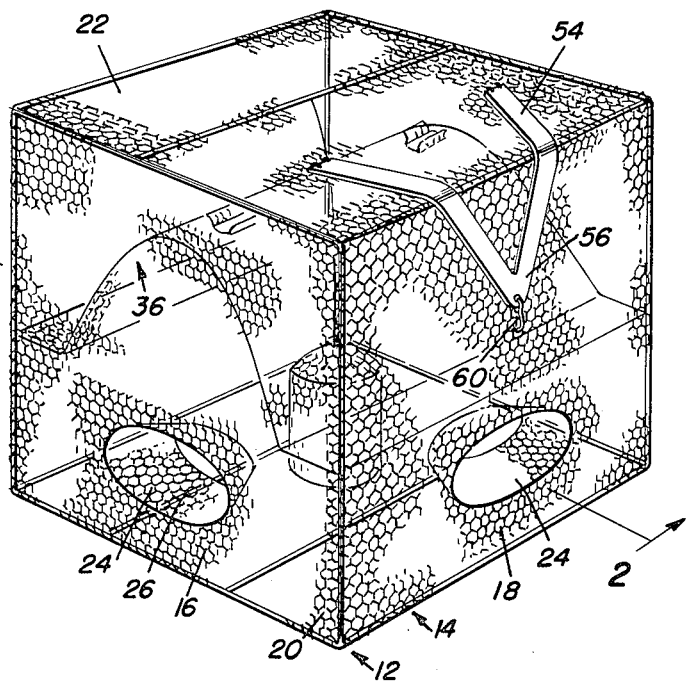
Figure 1 is a perspective view of the trap constituting the present invention.

In the drawings the numeral 10 designates the trap in its entirety consisting essentially of a rigid, rectangular box-shaped skeleton frame 12 covered with a reticulated material 14 composed of wire mesh forming side panels 18, and panels 16, bottom panel 20 and top panel 22 over the skeleton frame 12.

The side and end panels 14 and 16, respectively, have entrances 24 therein which are relatively wide as compared with their height to conform to the shape of a crab, having upwardly sloping passages 26 opening into a bait chamber 30 within the interior of the trap. Positioned on the bottom panel 20 and disposed within the interior trap is a bait cup 32 also of reticulated material, the top of this cup being closed and the bottom thereof being normally open to receive a bait.

Within the upper portion of the trap, a trap chamber 34 is formed by a partition 36 of reticulated material having a U-shaped portion 38 centrally thereof and running the length thereof between the ends 16 of the trap. The top of the inverted U-shaped portion 38 is spaced below the top panel 22 of the trap and openings 40 are formed in this top adjacent each end panel 20 of the trap for the passage of crabs from the bait chamber 30 into the trap chamber 34 of the trap.

A skeleton frame 22 is formed of edge-forming members 42 defining the edges of the trap, the frame being devoid of one edge-forming member between the top panel 22 and one of the side panels 14 for a purpose that will be subsequently apparent.

Suitable cross braces 46 may be provided between various of the edge-forming members making up the skeleton frame 12 to stiffen the skeleton frame, these cross braces being generally desirable across the top edge-forming members 42 and the bottom edge-forming members 42 of the skeleton frame, their spacing being a matter of choice.

Figure 4:
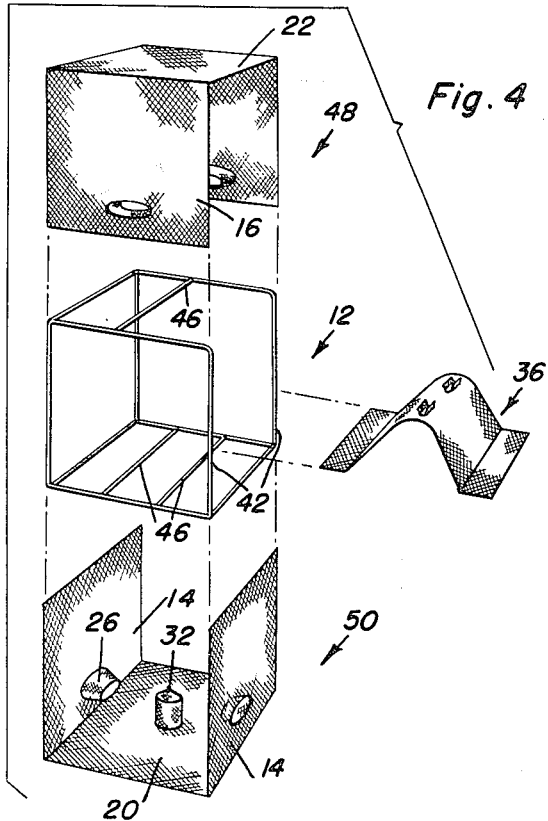
Figure 4 is an exploded perspective view of the manner of assembly of the wire mesh on the supporting frame.

The wire mesh covering of the frame and forming the panels thereof consists of two separate rectangular sections 48 and 50 as will be noted particularly in Figure 4.

Section 48 is bent into three panels forming the top panel 22 and side panels 16. When so bent, the section 48 is simply slipped over the skeleton frame 12.

Section 50 is likewise bent into three panels, forming the bottom panel 20 and side panels 14.

When the sections 48 and 50 are so placed over the skeleton frame 12, the edges of the panels meet with one another.

One set of the mating edges of the panels meet along the open edge of the skeleton frame and are unattached to one another to provide an opening into the trap chamber 34 of the trap 10 for removing the crabs therefrom, this being the purpose of the open edge on the skeleton frame 12.

Figure 3:
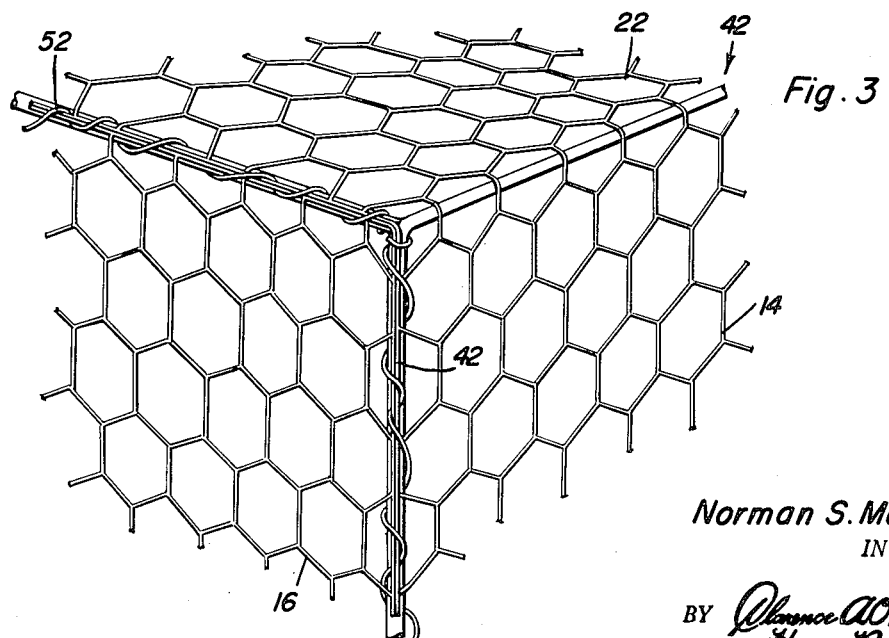
Figure 3 is an enlarged detailed view of the manner of interlacing the wire mesh panels of the trap with the edge defining members of the supporting frame of the trap.

The other sets of mating edges of the panels meet along the edge forming members of the supporting frame as will be particularly apparent in Figure 3. These last mentioned mating edges are laced to one another and to the edge forming members 42 of the supporting frame 12 by means of a continuous, bendable wire or the like, 52. The wire is initially looped over the mating edges of the panels per se and is then looped around an edge-forming member 42, thence looped around both the mating edges and an edge-forming member 42 and then the cycle begins again with the wire being wound around the mating edges of the panels per se. This cycle of operation is continued until all of the mating edges of the panels overlying the edge forming members 42 to the skeleton frame 12 are securely attached to one another and to such edge-forming members.

This manner of attachment necessitates only seven edge mating attachments versus eight in the conventional practice wherein a single mesh section is utilized to form the side and end panels and separate panels are utilized to form the top and bottom panels. In addition, with this manner of assembly, set forth in my invention, a practical, continuous stitching operation is possible.

To prevent spreading apart of the unattached mating edges of the top panel 22 and the side panel 14, a V-shaped strap 54 is secured at its ends to the top panel 22 and has its apex 56 disposed over the adjacent side panel 14 with a hook 60 thereon securing it to the mesh of the panel, the intermediate portion of the trap overlying the unattached mating panel edges and retaining them against spreading apart.

Figure 5:
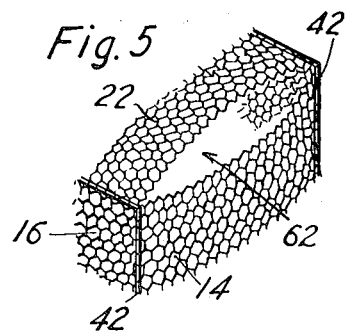
Figure 5 is a reduced perspective view of a portion of the top at one side of the trap showing the top open for emptying the catch therefrom.
Figure 2:
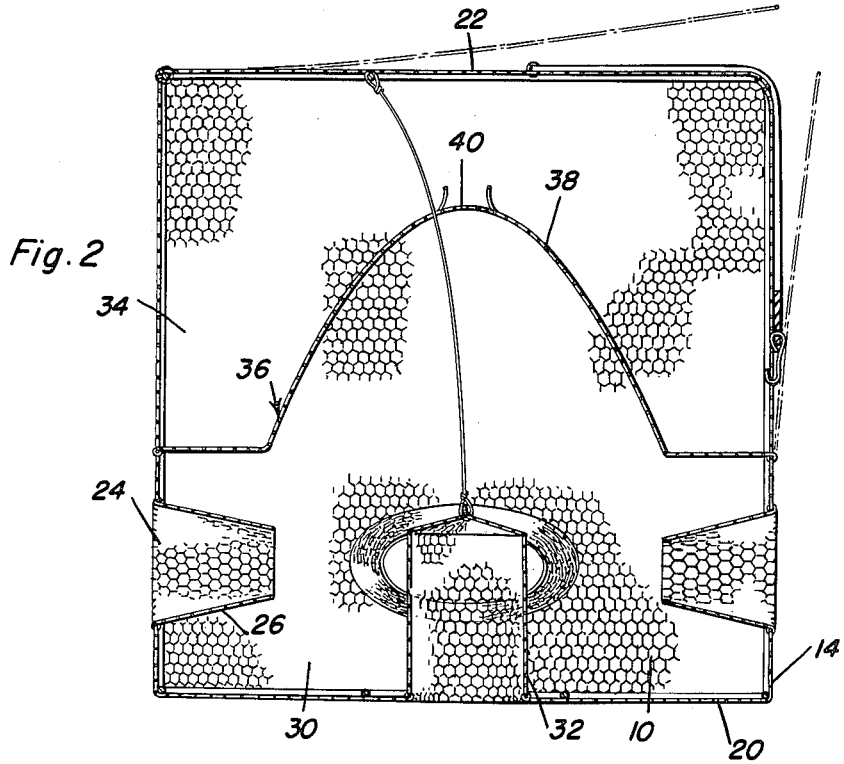
Figure 2 is a cross sectional view of the trap taken substantially along the plane of section line 2—2 of Figure 1.

To open the trap, strap 54 is unhooked and unattached mating edges of panels 22 and 14 spread apart as shown in Figures 3 and 5. The natural deformability of the wire mesh retains the panel edges in their spread apart relation to form the mouth 62 for the trap as shown in Figure 5 for emptying the same. Upon stretching the strap 54 over the side 14 and hooking the strap thereto, the unattached edges of the panels 14 and 22 are returned to and retained in their mating relation with one another. Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In a wire mesh trap comprising a main body divided into bait and trap chambers, the main body having an entrance passageway leading into said bait chamber, a bait cup in said bait chamber, a partition of inverted U-shape dividing the bait and trap chambers, said inverted U-shaped partition having an opening at the top thereof to give communication with the trap chamber; the improvement comprising a rigid, rectangular box-like, skeleton supporting frame disposed within the wire mesh of said trap, said mesh being formed over the edge forming members of said supporting frame, and means interlacing said wire mesh and the edge forming members of said supporting frame maintaining the shaping of said mesh in conforming relation to said frame and rigidly attaching said mesh to said frame, said wire mesh consisting of two separate rectangular panels, each having folds to provide three sections, each panel covering three faces of said skeleton frame, the edges of said panels mating with one another along the edge forming members of said supporting frame, said interlacing means facing said mating edges to one another and to said edge forming members, and said skeleton frame on one side having not more than three edges.

2. In a rectangular box-shaped wire mesh trap having openings into the interior of the trap, a rigid rectangular box shaped skeleton frame within said trap defined by edge forming members conforming to the edges of said trap, one edge of said frame being open, said wire mesh consisting of two separate rectangular sections each forming three panels covering three faces of said skeleton frame, the edges of said panels mating with one another, one set of mating edges mating along the open edge of said frame and being unattached providing an opening into said trap, the other mating edges of said panels meeting with one another along said edge forming members of said supporting frame, and means attaching said other mating edges and said edge forming members to one another.

References Cited in the file of this patent
UNITED STATES PATENTS

| Number | Name | Date |
|---|---|---|
| 163,719 | Arandall et al. | May 25, 1875 |
| 524,425 | Morton | Aug. 14, 1894 |
| 887,097 | Kimber | May 12, 1908 |
| 1,017,644 | Bolick | Feb. 20, 1912 |
| 2,007,296 | Crawford | July 9, 1935 |
| 2,123,471 | Lewis | July 12, 1938 |